(12) United States Patent
Dintenfass

(10) Patent No.: US 10,963,173 B2
(45) Date of Patent: Mar. 30, 2021

(54) SYSTEM FOR SMART CONTRACT DEPENDENT RESOURCE TRANSFER

(71) Applicant: BANK OF AMERICA CORPORATION, Charlotte, NC (US)

(72) Inventor: Katherine Dintenfass, Lincoln, RI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/268,062

(22) Filed: Feb. 5, 2019

(65) Prior Publication Data

US 2020/0249853 A1 Aug. 6, 2020

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 13/16 | (2006.01) |
| G06F 9/50 | (2006.01) |

(52) U.S. Cl.
CPC .......... *G06F 3/0631* (2013.01); *G06F 3/0604* (2013.01); *G06F 3/0673* (2013.01); *G06F 13/1668* (2013.01); *G06F 9/50* (2013.01)

(58) Field of Classification Search
CPC ................................ G06F 3/0631; G06F 9/50
USPC ......................................................... 711/154
See application file for complete search history.

(56) References Cited

U.S. PATENT DOCUMENTS

| | | | |
|---|---|---|---|
| 6,236,975 B1 | 5/2001 | Boe et al. | |
| 7,020,626 B1 | 3/2006 | Eng et al. | |
| 7,330,850 B1 | 2/2008 | Seibel et al. | |
| 7,349,881 B1 | 3/2008 | Lockwood | |
| 7,398,236 B2 | 7/2008 | Jaffe | |
| 7,447,656 B2 | 11/2008 | Parthasarathy | |
| 7,447,659 B2 | 11/2008 | Parthasarathy | |
| 7,689,507 B2 | 3/2010 | Hung et al. | |

(Continued)

OTHER PUBLICATIONS

Nigel Gopie, What are smart contracts on blockchain?, https://www.ibm.com/blogs/blockchain/2018/07/what-are-smart-contracts-on-blockchain/, IBM, Jul. 2, 2018 (Year: 2018).*

(Continued)

*Primary Examiner* — Edward J Dudek, Jr.
*Assistant Examiner* — Sidney Li
(74) *Attorney, Agent, or Firm* — Michael A. Springs; Moore & Van Allen PLLC; R. W. McCord Rayburn

(57) ABSTRACT

A system, computer program product, and computer-implemented method for smart contract dependent resource transfer are disclosed. The system is configured to establish a smart contract between a first storage location and a second storage location, the smart contract being configured for conditionally transferring resources between the first storage location and the second storage location; monitor the first storage location to determine that a first transfer condition has been met; based on determining that the first transfer condition has been met, automatically transfer a number of resources from the second storage location to the first storage location; determine that a second transfer condition has been met; and automatically transfer the number of resources from the first storage location to the second storage location based on determining that the second transfer condition has been met.

18 Claims, 6 Drawing Sheets

(56) References Cited

U.S. PATENT DOCUMENTS

| | | |
|---|---|---|
| 7,734,641 B2 | 6/2010 | Kanigsberg et al. |
| 7,752,102 B2 | 7/2010 | Thomas |
| 7,792,697 B2 | 9/2010 | Bhagchandani et al. |
| 7,797,208 B2 | 9/2010 | Thomas |
| 7,873,569 B1 | 1/2011 | Cahn |
| 8,024,213 B1 | 9/2011 | Fano et al. |
| 8,144,007 B2 | 3/2012 | Tuck et al. |
| 8,285,622 B1 | 10/2012 | Rao et al. |
| 8,301,514 B1 | 10/2012 | Vippagunta |
| 8,417,584 B2 | 4/2013 | Ross |
| 8,473,380 B2 | 6/2013 | Thomas et al. |
| 8,478,691 B2 | 7/2013 | Solomon et al. |
| 8,571,919 B2 | 10/2013 | Rane et al. |
| 8,571,975 B1 | 10/2013 | Lehman et al. |
| 8,572,072 B1 | 10/2013 | Roumeliotis |
| 8,666,836 B2 | 3/2014 | Adams |
| 8,782,076 B2 | 7/2014 | Rothman et al. |
| 8,838,499 B2 | 9/2014 | Del Bene et al. |
| 9,256,876 B2 | 2/2016 | Vasant Akole et al. |
| 9,311,386 B1 | 4/2016 | Song et al. |
| 9,460,468 B2 | 10/2016 | Boberski et al. |
| 9,495,703 B1 | 11/2016 | Kaye, III |
| 9,672,283 B2 | 6/2017 | Pappas et al. |
| 9,710,821 B2 | 7/2017 | Heath |
| 9,767,182 B1 | 9/2017 | Thakur et al. |
| 9,875,491 B2 | 1/2018 | Weksler |
| 2008/0033852 A1 | 2/2008 | Megdal et al. |
| 2010/0145772 A1 | 6/2010 | McCauley et al. |
| 2011/0082718 A1 | 4/2011 | Ghosh et al. |
| 2011/0178848 A1 | 7/2011 | Rane et al. |
| 2012/0005053 A1 | 1/2012 | Burgess et al. |
| 2013/0054314 A1 | 2/2013 | Ross et al. |
| 2013/0311326 A1 | 11/2013 | Lucas et al. |
| 2014/0025491 A1 | 1/2014 | Nagarajan et al. |
| 2014/0095251 A1 | 4/2014 | Huovilainen |
| 2016/0071201 A1 | 3/2016 | Zhang et al. |
| 2016/0180465 A1 | 6/2016 | Deperro et al. |
| 2016/0342982 A1* | 11/2016 | Thomas ............. G06Q 20/027 |
| 2016/0371772 A1 | 12/2016 | Zuluaga Rueda et al. |
| 2017/0011444 A1 | 1/2017 | Greystoke et al. |
| 2017/0024813 A1 | 1/2017 | Crouspeyre et al. |
| 2017/0061535 A1 | 3/2017 | Williams |
| 2017/0092054 A1* | 3/2017 | Petersen ............. G07F 17/3209 |
| 2017/0126581 A1* | 5/2017 | Wadley ................... H04L 47/76 |
| 2017/0193501 A1 | 7/2017 | Cole et al. |
| 2018/0005323 A1 | 1/2018 | Grassadonia |
| 2018/0096313 A1 | 4/2018 | Chenard et al. |
| 2018/0144412 A1 | 5/2018 | Chenard et al. |
| 2018/0189888 A1 | 7/2018 | Deperro et al. |
| 2018/0218176 A1 | 8/2018 | Voorhees et al. |
| 2018/0276710 A1 | 9/2018 | Tietzen et al. |
| 2020/0241929 A1* | 7/2020 | Arrasjid ............. G06F 11/3089 |

OTHER PUBLICATIONS http://theconversation.com/when-ai-meets-your-shopping-experience-it-knows-what-you-buy-and-what-you-ought-to-buy-101737.
https://www.orpheus-it.com/big-data/artificial-intelligence-in-procurement.

* cited by examiner

SYSTEM FOR SMART CONTRACT DEPENDENT RESOURCE TRANSFER

BACKGROUND

Block chains leveraging smart contract protocols are a growing, highly-adaptive new technology already being implemented across multiple industries. Due to the unique characteristics inherent to the block chain structure and smart contract execution, the technology is able to provide unique security to executed processes and stored data. As a result, there exists a need to implement block chain and smart contract technology to improve electronic resource transfers between storage locations, and in particular management of temporary resource transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for managing electronic resource transfers based on established smart contract requirements within a block chain distributed network environment. A system for smart contract dependent resource transfer is provided herein, the system comprising: at least one memory device with computer-readable program code stored thereon; at least one communication device connected to a network; and at least one processing device, wherein the at least one processing device is configured to execute the computer-readable program code to: establish a smart contract between a first storage location and a second storage location, the smart contract being configured for conditionally transferring resources between the first storage location and the second storage location; monitor the first storage location to determine that a first transfer condition has been met; based on determining that the first transfer condition has been met, automatically transfer a number of resources from the second storage location to the first storage location; determine that a second transfer condition has been met; and automatically transfer the number of resources from the first storage location to the second storage location based on determining that the second transfer condition has been met. In one embodiment, the smart contract is established on a block chain in a block chain distributed network environment.

In yet another embodiment, the first transfer condition comprises the first storage location falling below a predetermined resource threshold. In yet another embodiment, the predetermined resource threshold is a first predetermined resource threshold, and wherein the second transfer condition comprises the first storage location exceeding a second predetermined resource threshold. In yet another embodiment, the first predetermined resource threshold and the second predetermined resource threshold are different, and wherein the second predetermined resource threshold is higher than the first predetermined resource threshold. In yet another embodiment, the at least one processing device is further configured to execute the computer-readable program code to: determine that the second transfer condition has been met by determining that the number of resources is available in the first storage location and not in use; and automatically transfer the number of resources from the first storage location to the second storage location without causing the first storage location to fall below the first predetermined resource threshold. In yet another embodiment, the second transfer condition comprises a predetermined period of time having elapsed. In yet another embodiment, the at least one processing device is further configured to execute the computer-readable program code to generate a message following completion of a resource transfer, wherein the message is output on a hardware device associated with at least one of the first storage location and the second storage location.

A computer program product for smart contract dependent resource transfer is also disclosed herein, wherein the computer program product comprises at least one non-transitory computer-readable medium comprising computer-readable instructions, the computer-readable instructions, when executed by at least one processing device, cause the at least one processing device to: establish a smart contract between a first storage location and a second storage location, the smart contract being configured for conditionally transferring resources between the first storage location and the second storage location; monitor the first storage location to determine that a first transfer condition has been met; based on determining that the first transfer condition has been met, automatically transfer a number of resources from the second storage location to the first storage location; determine that a second transfer condition has been met; and automatically transfer the number of resources from the first storage location to the second storage location based on determining that the second transfer condition has been met. In one embodiment, the smart contract is established on a block chain in a block chain distributed network environment.

In yet another embodiment, the first transfer condition comprises the first storage location falling below a predetermined resource threshold. In yet another embodiment, the predetermined resource threshold is a first predetermined resource threshold, and wherein the second transfer condition comprises the first storage location exceeding a second predetermined resource threshold. In yet another embodiment, the first predetermined resource threshold and the second predetermined resource threshold are different, and wherein the second predetermined resource threshold is higher than the first predetermined resource threshold. In yet another embodiment, the computer-readable instructions, when executed by at least one processing device, cause the at least one processing device to: determine that the second transfer condition has been met by determining that the number of resources is available in the first storage location and not in use; and automatically transfer the number of resources from the first storage location to the second storage location without causing the first storage location to fall below the first predetermined resource threshold. In yet another embodiment, the second transfer condition comprises a predetermined period of time having elapsed. In yet another embodiment, the computer-readable instructions, when executed by at least one processing device, cause the at least one processing device to generate a message following completion of a resource transfer, wherein the message is output on a hardware device associated with at least one of the first storage location and the second storage location.

A computer-implemented method for smart contract dependent resource transfer is also disclosed, the computer-implemented method comprising: establishing a smart contract between a first storage location and a second storage location, the smart contract being configured for conditionally transferring resources between the first storage location and the second storage location; monitoring the first storage location to determine that a first transfer condition has been met; based on determining that the first transfer condition has been met, automatically transferring a number of resources from the second storage location to the first storage location; determining that a second transfer condition has been met; and automatically transferring the number of resources from the first storage location to the second storage location based on determining that the second transfer condition has been met. In one embodiment, the smart contract is established on a block chain in a block chain distributed network environment.

In yet another embodiment, the first transfer condition comprises the first storage location falling below a predetermined resource threshold. In yet another embodiment, the predetermined resource threshold is a first predetermined resource threshold, and wherein the second transfer condition comprises the first storage location exceeding a second predetermined resource threshold.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
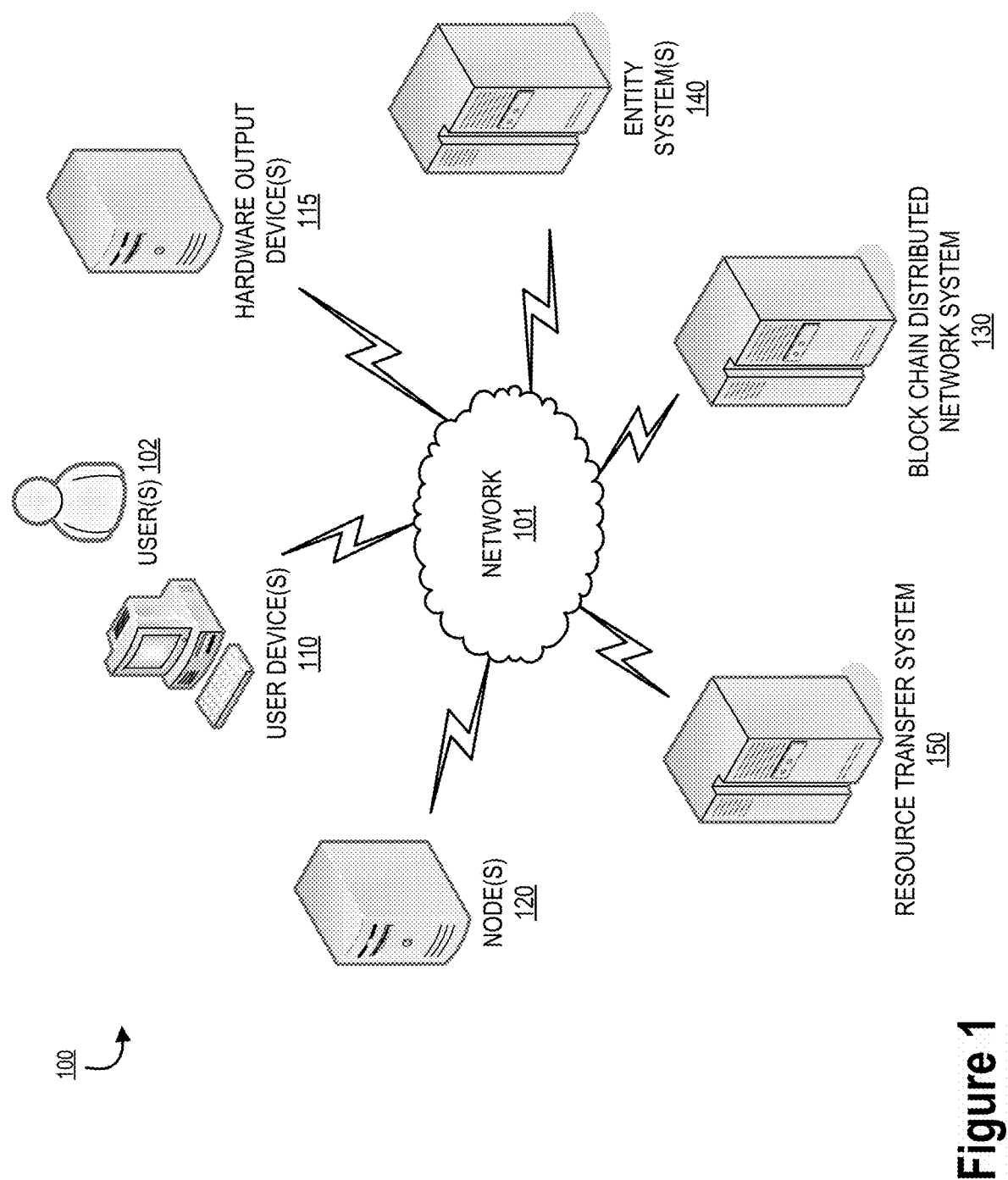
Figure 2:
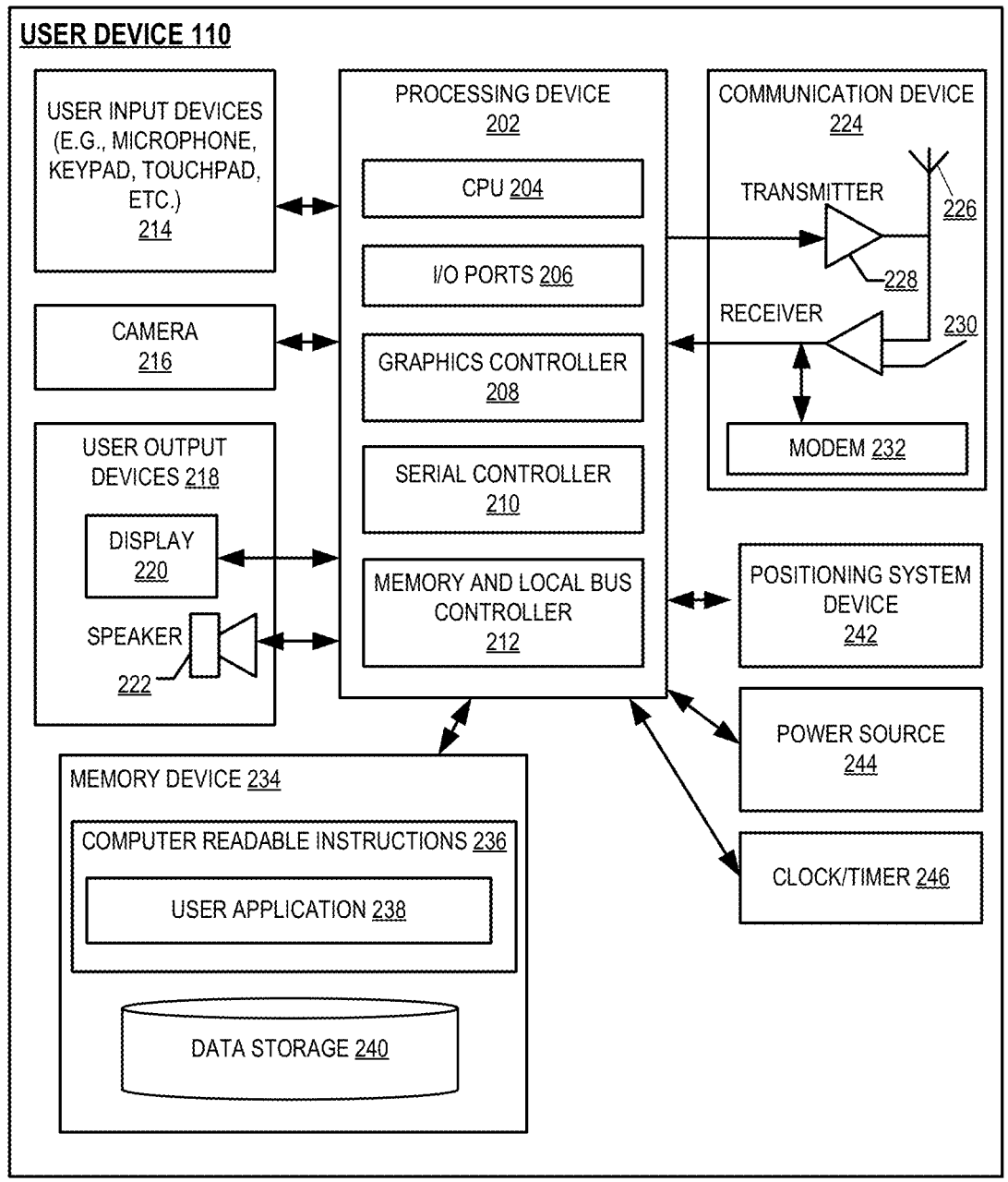
Figure 3:
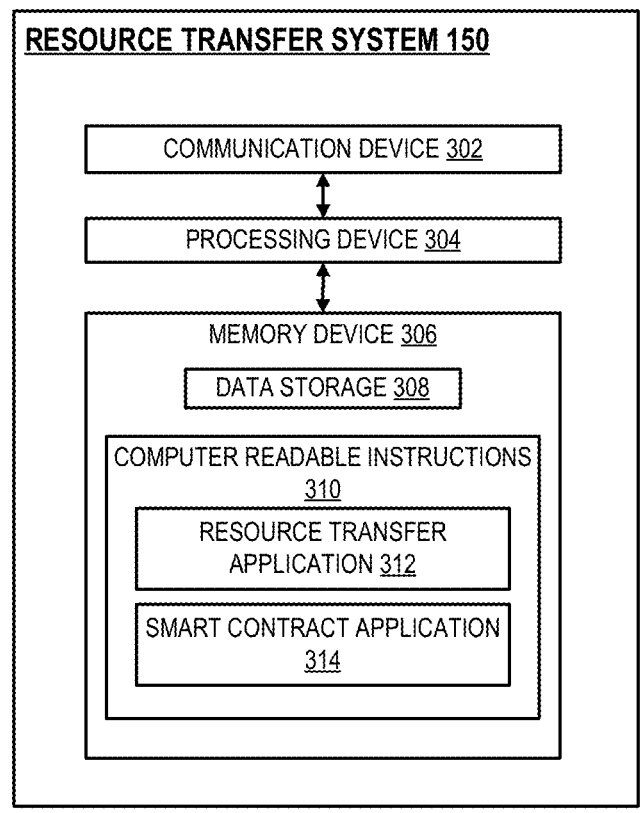
Figure 4A:
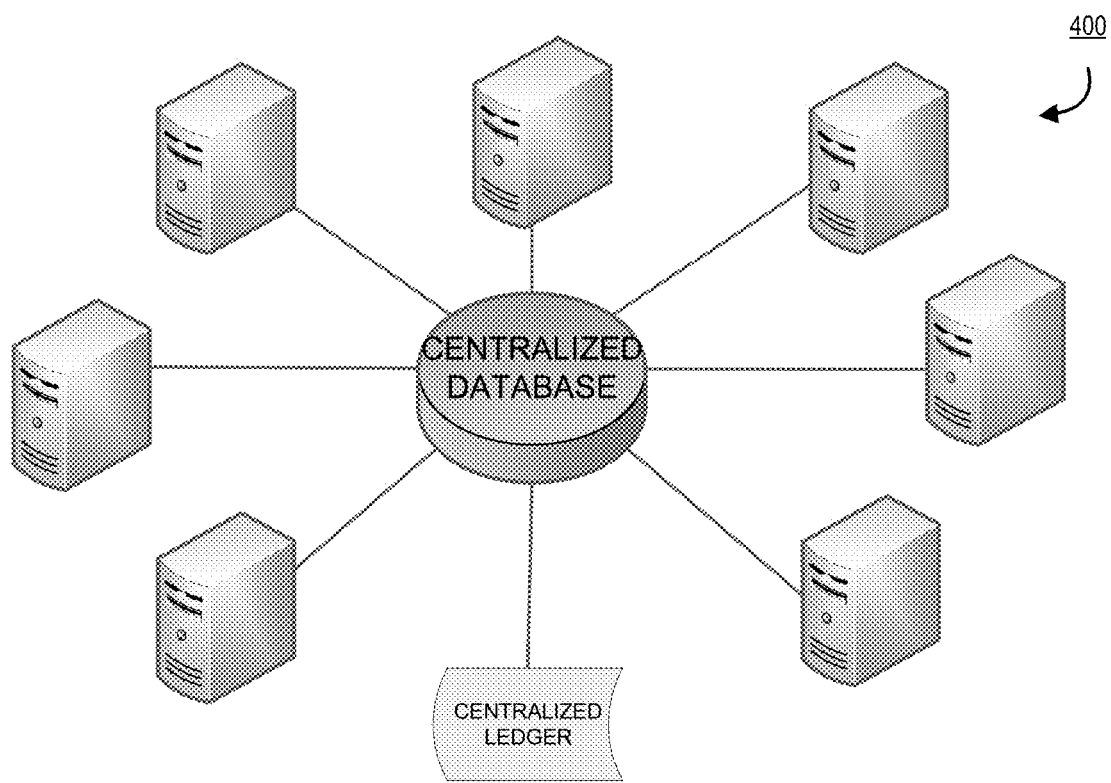
Figure 4B:
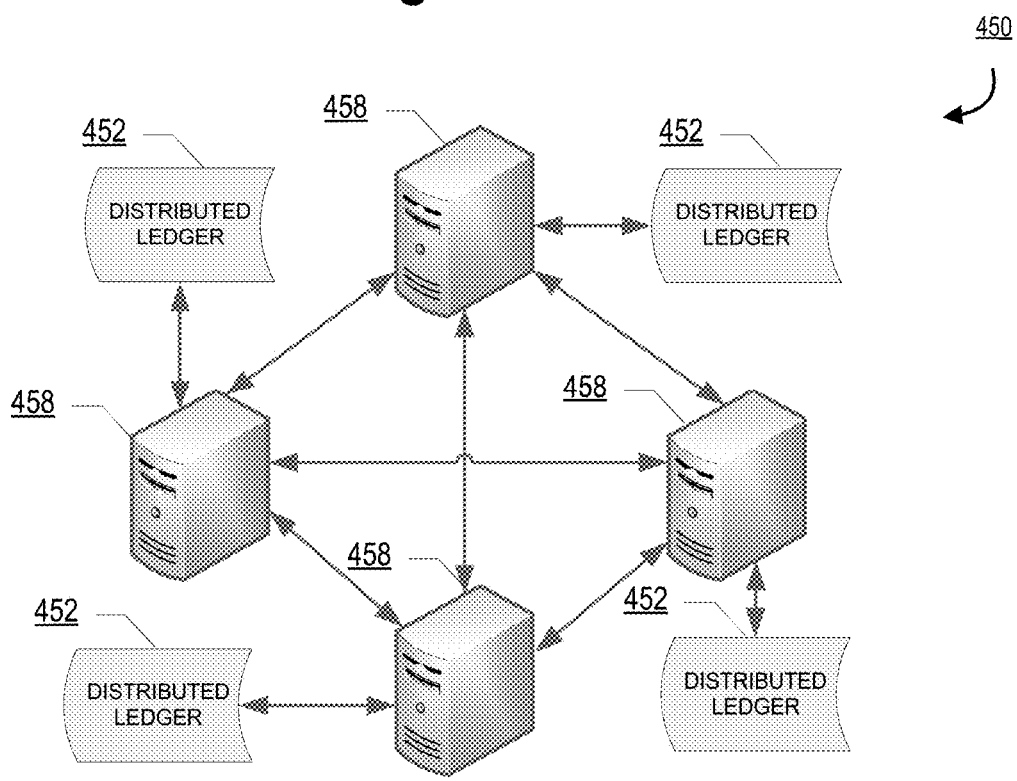
Figure 5:
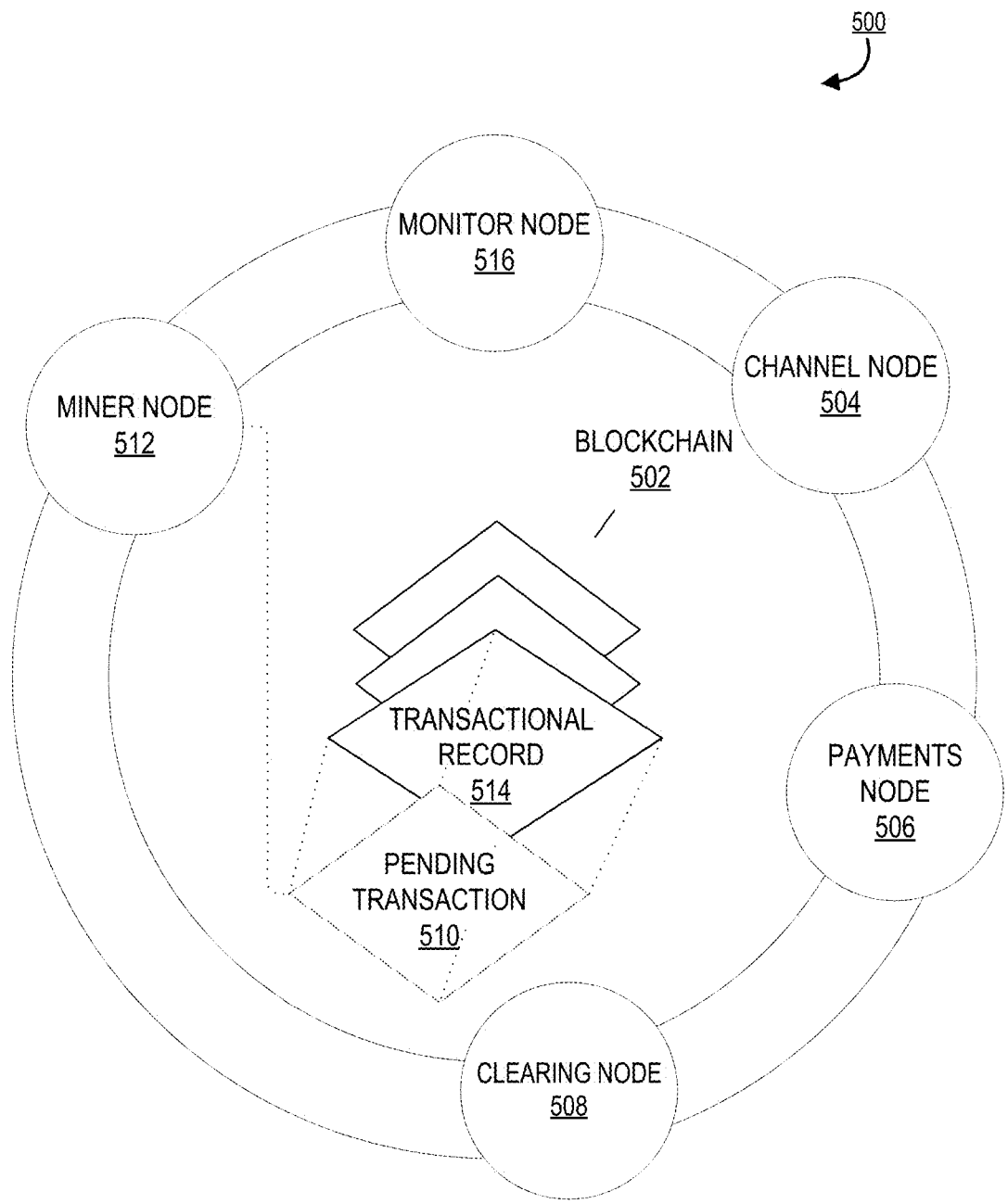
Figure 6:
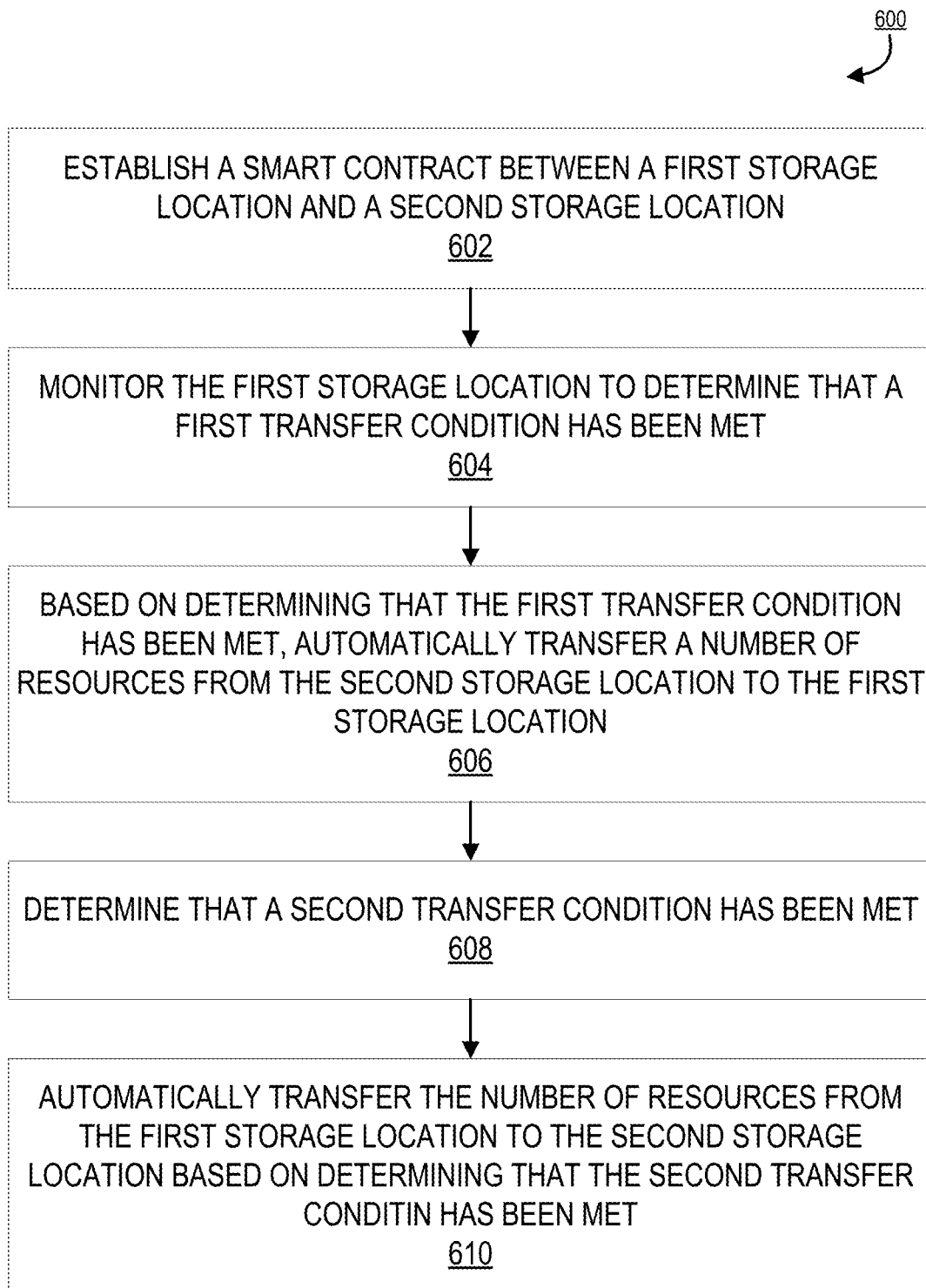

Having thus described embodiments of the invention in general terms, reference will now be made to the accompanying drawings, wherein:

FIG. 1 provides a smart contract dependent resource transfer system environment, in accordance with one embodiment of the invention;

FIG. 2 provides a block diagram of a user device, in accordance with one embodiment of the invention;

FIG. 3 provides a block diagram of the resource transfer system, in accordance with one embodiment of the invention;

FIG. 4A provides a centralized database architecture environment, in accordance with one embodiment of the invention;

FIG. 4B provides a high level block chain system environment architecture, in accordance with one embodiment of the invention;

FIG. 5 provides a high level process flow illustrating node interaction within a block chain system environment architecture, in accordance with one embodiment of the invention; and FIG. 6 provides a high level process flow for automatically managing electronic resource transfers based on established smart contract requirements, in accordance with one embodiment of the invention;

DETAILED DESCRIPTION OF EMBODIMENTS OF THE INVENTION

Embodiments of the invention are directed to improvements to electronic resource transfer technology leveraging smart contract management and enforcement to determine rule-based, conditional resource transfer execution between storage locations. The smart contracts may be configured to manage temporary resource transfers to resource-deficient storage locations, systems, or devices, wherein fulfillment of one or more transfer conditions trigger the resource transfers themselves as well as transfer details (i.e., resource transfer scheduling, number of resources transferred, and the like).

Embodiments of the present invention use block chain and smart contract technologies in nonconventional, unexpected ways by leveraging the technologies to control and improve electronic resources transfers, and in particular, temporary electronic resource transfer, wherein resources are temporarily transferred or leveraged between storage locations, systems, or devices. Block chain and smart contract technologies improve electronic resource transfers by increasing resource transfer security. Through the use of smart contracts in a distributed network environment, resource transfers may be performed credibly without the need for additional third parties. Furthermore, interactions executed according to the smart contract terms are secure, trackable, and irreversible.

Embodiments of the invention provide a technical solution to a problem by utilizing block chain systems in a nonconventional way. Unlike a more traditional centralized approach to block chain regulation, wherein one or more regulatory nodes are added to each block chain to regulate each chain with the nodes, the present invention implements a decentralized block chain regulation architecture by utilizing the collective nature of block chain communication to perform key regulatory and control functions. Instead of relying on a centralized regulatory source, the present system allows the block chain structures themselves to simultaneously function as both regulated and regulatory chains for one another to form an interconnected network of decentralized, regulatory chains.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a user device may refer to an entity's computer system, platform, servers, databases, networked devices, or the like. The user device may be used by the user to access the system directly or through an application, online portal, internet browser, virtual private network, or other connection channel. The user device may be a computer device within a network of connected computer devices that share one or more network storage locations.

A "user" as used herein may refer to any entity or individual associated with the smart contract dependent resource transfer system. In some embodiments, a user may be a computing device user, a phone user, a mobile device application user, a financial institution customer (e.g., an account holder or a person who has an account (e.g., banking account, credit account, or the like)), and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the smart contract dependent resource transfer system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, a "connection" or an "interaction" may refer to any communication between one or more users, one or more entities or institutions, and/or one or more devices or systems within the system environment described herein. For example, an interaction may refer to a transfer of data or other resources (e.g., funds) between systems, devices, and/ or application; an accessing of stored data by one or more devices; a transmission of a requested task; a sharing or leveraging of computing resources between device; or the like. In another example, an interaction may refer to a user interaction with a user device through a user interface in order to connect or communicate with an entity and/or entity system to complete an operation (e.g., request a transfer of funds from another user or account, complete a form, or the like). In another embodiment, an "interaction" may refer to a financial transaction executed between two or more users and/or entities (e.g., a transfer of resources)

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module may monitor user resource usage, requested resource usage, and/or a number of resources available in a resource storage location or account.

The term "smart contract," as used herein, refers to a computer process, protocol, or algorithm established to facilitate, verify, and/or enforce negotiation or performance of a contract between parties. Operations or interactions executed according to a smart contract may be performed credibly without additional third parties. When implemented in a block chain distributed network environment on a collection of nodes, the operations or interactions executed according to the smart contract terms are secure, trackable, and irreversible, thereby providing improved interaction security over traditional interaction execution methods. Smart contracts include logic that emulates contractual clauses that are partially or fully self-executing and/or self-enforcing. The smart contracts provide guidelines for transfer of data or other resources (e.g., funds) between users as well as rules for executing interactions. The smart contracts may further define consensus (e.g., proof of work) and encryption mechanisms for the information or data of an interaction (e.g., user identifying information). In one embodiment, smart contracts are configured to conditionally transfer resources between user storage locations based on one or more predetermined requirements or contractual agreements between the users.

The terms "block chain," "blockchain," or "distributed ledger," as used herein, refer to a decentralized electronic ledger of data records which are authenticated by a federated consensus protocol. Multiple computer systems within the block chain, referred to herein as "nodes" or "compute nodes," each comprise a copy of the entire ledger of records. Nodes may write a data "block" to the block chain, the block comprising data regarding a transaction, said blocks further comprising data and/or metadata. In some embodiments, only miner nodes may write transactions to the block chain. In other embodiments, all nodes have the ability to write to the block chain. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the block chain will persist so long as the nodes on the block chain persist. A "private block chain" or "permissioned block chain" is a block chain in which only authorized nodes may access the block chain. In some embodiments, nodes must be authorized to write to the block chain. In some embodiments, nodes must also be authorized to read from the block chain. Once a transactional record is written to the block chain, it will be considered pending and awaiting authentication by the miner nodes in the block chain.

A "block" as used herein may refer to one or more records of a file with each record comprising data for transmission to a server. In some embodiments, the term record may be used interchangeably with the term block to refer to one or more transactions or data within a file being transmitted. In particular, the block chain begins with a genesis block and is subsequently lengthened by appending blocks in series to the genesis block. Generally, the data within each block within the block chain may not be modified by the nodes of the block chain; data may only be added through the addition of a block to the last block in the block chain. Each block added to the block chain may comprise a timestamp and a pointer to the previous block in the block chain. In this way, the block chain may provide an immutable record of data records over a period of time. In some embodiments, in order for a new block to be added to the block chain, a pending data record may be proposed to be added to the block chain. The nodes may then, via a "consensus algorithm" or "consensus mechanism," come to a consensus as to the contents of the data in the block chain. Once a consensus has been reached by the nodes that the pending data record is valid, the nodes append the data record to the last block in the block chain. In this way, each node maintains a validated copy of the block chain such that the block chain may remain accessible even if one or more nodes become unavailable (e.g. a node is offline due to maintenance, malfunction, etc.) and may further account for divergence from the true copy of the block chain which may occur at the node level (e.g. a copy of the block chain on a particular node becomes invalid due to data corruption, malicious editing, and the like). In other words, the consensus mechanism ensures that, over time, each node hosts a copy of the block chain that is consistent with the other nodes.

Embodiments of the invention as described herein may utilize one, several, or a combination (i.e. hybrid) of a number of different consensus algorithms to ensure the integrity of the data within the block chain. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

"Miner node" as used herein refers to a networked computer system or device that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain, thus reducing the likelihood of data record tampering and increasing the security of the transactions within the system.

FIG. 1 provides a system that includes specialized systems and devices communicably linked across a distributive network of nodes required to perform the functions of implementing the smart contract dependent resource transfer system as described herein. FIG. 1 provides a smart contract dependent resource transfer system environment 100, in accordance with one embodiment of the present invention. As illustrated in FIG. 1, the block chain distributed network system 130 is operatively coupled, via a network 101 to the user device 110, hardware output devices 115, nodes 120, the entity system 140, and the resource transfer system 150. In this way, the block chain distributed network system 130 can send information to and receive information from the user device 110, hardware output devices 115, nodes 120, entity system 140, and the resource transfer system 150. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In one embodiment, the network 101 is a block chain distributed network.

In some embodiments, the user 102 is an individual or system that desires to implement the smart contract dependent resource transfer system of the present invention over the network 101. In some embodiments a user 102 is a user or entity completing a transaction to be recorded on a block chain. In other embodiments, the user 102 is a user or entity managing data storage on the block chain. In one embodiment, the user 102 is a user completing and resource transfer interaction with another user over the network 101 according to the requirements of a smart contract. In some embodiments, the user 102 has a user device 110, such as a mobile phone, tablet, or the like that may interact with and control the recordation and validation of blocks on the block chain through interaction with the devices and systems of the environment 100. In one embodiment, the user device 110 may be used to interact It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for managing resource transfer requests and interactions as well as managing smart contract terms. The user application 238 may also allow the user to view and manipulate data and/or resources for transfer to and from other users. In one embodiment, the user application 238 allows the user to create or establish a smart contract with another user.

The processing device 202 may be configured to use the communication device 224 to communicate with one or more other devices on a network 101 such as, but not limited to the block chain distributed network system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes an entity system 140 (as illustrated in FIG. 1) which is connected to the user device 110, the hardware output device 115, the nodes 120, the block chain distributed network system 130, and the resource transfer system 150 and may be associated with one or more financial institutions or financial entities. In this way, while only one entity system 140 is illustrated in FIG. 1, it is understood that multiple network systems may make up the system environment 100. The entity system 140 generally comprises a communication device, a processing device, and a memory device. The entity system 140 comprises computer-readable instructions stored in the memory device, which in one embodiment includes the computer-readable instructions of a financial institution application. The entity system 140 may communicate with the user device 110, the nodes 120, the block chain distributed network system 130, and the resource transfer system 150 to, for example, complete transactions on the block chain. The block chain distributed network system 130 includes a distributed ledger of the interactions on the block chain. The block chain distributed network system 130 will be outlined below in more detail with respect to FIGS. 4-5. In some embodiments, entity systems may be part of the block chain. The nodes 120 comprise the same or similar features as the user device 110 and the entity system 140. In some embodiments, the nodes 120 may be user devices 110 forming a plurality of networked devices participating in a block chain environment.

FIG. 3 provides a block diagram of the resource transfer system 150, in accordance with one embodiment of the invention. The resource transfer system 150 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 306 is operatively coupled to the communication device 302 and the memory device 306. The processing device 304 uses the communication device 302 to communicate with the network 101 and other devices on the network 101, such as, but not limited to the user device 110, the nodes 120, the entity system 140, and the block chain distributed network system 130. As such, the communication device 302 generally comprises a modem, server, or other device for communicating with other devices on the network 101.

As further illustrated in FIG. 3, the resource transfer system 150 comprises computer-readable instructions 310 stored in the memory device 306, which in one embodiment includes the computer-readable instructions 310 of a resource transfer application 312. In some embodiments, the memory device 306 includes data storage 308 for storing data related to the system environment, but not limited to data created and/or used by the resource transfer application 312.

Embodiments of the resource transfer system 150 may include multiple systems, servers, computers or the like maintained by one or many entities. In some embodiments, the resource transfer system 150 is part of an entity system 140. In other embodiments, the entity system 140 is distinct from the resource transfer system 150. The resource transfer system 150 may communicate with the entity system 140 via a secure connection generated for secure encrypted communications between the two systems.

In one embodiment of the resource transfer system 150, the memory device 306 stores, but is not limited to, a smart contract application 314. In some embodiments, the smart contract application 314 stores data including, but not limited to, records, terms and conditions, and/or the like of one or more smart contracts established between users for resource transfers. In one embodiment of the invention, both the resource transfer application 312 and the smart contract application 314 may associate with applications having computer-executable program code that instruct the processing device 304 to operate the network communication device 302 to perform certain communication functions to execute steps described herein. In one embodiment, the computer-executable program code of an application associated with the smart contract application 314 and resource transfer application 312 may also instruct the processing device 304 to perform certain logic, data processing, and data storing functions of the application.

The processing device 304 is configured to use the communication device 302 to gather data, such as data corresponding to interactions or other updates to smart contract terms from various data sources such as the block chain network system 130. The processing device 304 stores the data that it receives in the memory device 306.

In one embodiment, the resource transfer system 150 may be maintained by an entity such as a regulatory agency or financial entity for regulating smart contracts on a block chain and ensuring data health and security through the processes described herein.

FIG. 4A illustrates a centralized database architecture environment 400, in accordance with one embodiment of the present invention. The centralized database architecture comprises multiple nodes from one or more sources and converge into a centralized database. The system, in this embodiment, may generate a single centralized ledger for data received from the various nodes. FIG. 4B provides a general block chain system environment architecture 450, in accordance with one embodiment of the present invention. Rather than utilizing a centralized database of data for instrument conversion, as discussed above in FIG. 4A, various embodiments of the invention may use a decentralized block chain configuration or architecture as shown in FIG. 4B.

A block chain is a distributed database that maintains a list of data blocks associated with one or more storage locations, smart contract records, or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data blocks recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet or storage location and, in some cases that meets other criteria (e.g., meets conditions of established smart contracts).

As mentioned above and referring to FIG. 4B, a block chain system 450 is typically decentralized—meaning that a distributed ledger 452 (i.e., a decentralized ledger) is maintained on multiple nodes 458 of the block chain 450. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 458 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

FIG. 5 provides a high level process flow illustrating node interaction within a block chain system environment architecture 500, in accordance with one embodiment of the present invention. As illustrated and discussed above, the block chain system may comprise at least one or more nodes used to generate blocks. The nodes as discussed with respect to FIG. 5 may be the nodes 120 of the system environment 100 discussed in FIG. 1. In some embodiments, the channel node 504, payments node 506, monitor node 516 or the clearing node 508 may publish a pending transaction 510 to the block chain 502. At this stage, the transaction has not yet been validated by the miner node(s) 512, and the other nodes will delay executing their designated processes. The miner node 512 may be configured to detect a pending transaction 510. Upon verifying the integrity of the data in the pending transaction 510, the miner node 512 validates the transaction and adds the data as a transactional record 514, which is referred to as a block to the block chain 502. Once a transaction has been authenticated in this manner, the nodes will consider the transactional record 514 to be valid and thereafter execute their designated processes accordingly. The transactional record 514 will provide information about the transaction processed and transmitted through and metadata coded therein for searchability of the transactional record 514 within a distributed ledger.

In some embodiments, the system may comprise at least one additional miner node 512. The system may require that pending transactions 510 be validated by a plurality of miner nodes 512 before becoming authenticated blocks on the block chain. In some embodiments, the systems may impose a minimum threshold number of miner nodes 512 needed. The minimum threshold may be selected to strike a balance between the need for data integrity/accuracy (i.e., security/immutability) versus expediency of processing. In this way, the efficiency of the computer system resources may be maximized.

Furthermore, in some embodiments, a plurality of computer systems is in operative networked communication with one another through a network. The network may be a system specific distributive network receiving and distributing specific network feeds and identifying specific network associated triggers.

In some embodiments, the computer systems represent the nodes of the block chain, such as the miner node or the like. In such an embodiment, each of the computer systems comprise the block chain, providing for decentralized access to the block chain as well as the ability to use a consensus mechanism to verify the integrity of the data therein. In some embodiments, an upstream system and a downstream system are further operatively connected to the computer systems and each other through the network. The upstream system further comprises a ledger and the block chain. The downstream system further comprises the block chain and an internal ledger, which in turn comprises a copy of the ledger.

In some embodiments, a copy of block chain may be stored on a durable storage medium within the computer systems or the upstream system or the downstream system. In some embodiments, the durable storage medium may be RAM. In some embodiments, the durable storage medium may be a hard drive or flash drive within the system.

FIG. 6 provides a high level process flow 600 for automatically managing electronic resource transfers based on established smart contract requirements, in accordance with one embodiment of the invention. As illustrated in block 602, the system initially establishes a smart contract between a first storage location and as second storage location. A storage location, as described herein, may be a resource storage location or repository for storage of one or more resources (e.g., data, computing resources, funds). In a specific embodiment, a storage location is an account such as a financial account, digital wallet, or the like maintained by an entity.

In another specific embodiment, a storage location may be used to describe a source or destination of a transferred resource. For example, a user device (e.g., a personal computer) may be a source of a resources transferred to another user device. Alternatively, a user device may be a destination for one or more transferred resources. In one embodiment, a resource may be one or more computing resources transferred to or leveraged by a recipient user device or system, wherein the recipient user device or system leverages or uses transferred computing resources for executing or completing one or more processes. For example, computing resources (e.g., processing power, memory capacity, or the like) of a first device may be leveraged by a second device to execute or complete a resource-intensive computing process or calculation.

As previously discussed, a smart contract refers to a computer process, protocol, or algorithm established to facilitate, verify, and/or enforce negotiation or performance of a contract between parties. Operations or interactions executed according to a smart contract may be performed credibly without additional third parties. When implemented in a block chain distributed network environment on a collection of nodes, the operations or interactions executed according to the smart contract terms are secure, trackable, and irreversible, thereby providing improved interaction security over traditional interaction execution methods. Smart contracts include logic that emulates contractual clauses that are partially or fully self-executing and/or self-enforcing. The smart contracts provide guidelines for transfer of data or other resources between user devices or locations as well as rules for executing interactions. In one embodiment, smart contracts are configured to conditionally transfer resources between user storage locations based on one or more predetermined requirements or contractual agreements between the users.

The system establishes a smart contract by defining one or more conditional terms for managing and controlling automatic resource transfers between resource storage locations. The conditions may be stored in the smart contract which may be configured for enabling a resource transfer based on determining that one or more resource transfer conditions are met. The smart contract is configured to execute one or more tasks or processes when triggered by determining that one or more conditions for transfer have been met.

As illustrated in block 604, the system monitors the first storage location to determine that a first transfer condition has been met. Transfer conditions may be created by the system and be agreed upon by the users in order to determine when a resource transfer may automatically occur. Multiple transfer conditions may be relied upon to determine a resource transfer. For example, the system may determine multiple, different transfer conditions, wherein a resource transfer may be initiated when one or more of the different transfer conditions are met. In this way, a resource transfer may be initiated in varying scenarios and are not limited to a single situational condition.

In one embodiment, a transfer condition may be a predetermined threshold resource amount of a resources storage location, wherein the system monitors a number of resources stored in one or more storage locations. For example, a transfer condition may require that a number of resources associated with a recipient storage location fall below a predetermined threshold amount in order for a resource transfer to be executed automatically by the system. In another embodiment, a transfer condition may comprise a source resource storage location having a number of resources exceeding another predetermined threshold resource amount. In yet another embodiment, transfer conditions may include monitoring a number of resources in both a source and a recipient storage location, wherein conditional thresholds for each storage location must be met in order for a transfer to be executed. In one example, the recipient storage location is a financial account, wherein a transfer of funds from another account is executed upon the recipient account falling below a predetermined balance and/or a source account exceeding another predetermined balance. In this example, the system may be configured to continuously monitor resource deposits and withdrawals to and from the storage locations through communication with one or more other systems (e.g., entity system 140).

In another embodiment, a transfer condition may comprise a predetermine period of time having elapsed, wherein a resource transfer occurs regularly according to a schedule. For example, a smart contract may execute a resource transfer between storage locations daily, weekly, monthly, or the like or, alternatively, according to a non-regular, predetermined schedule as determined by the users. For example, the resource transfer may coincide with one or more events such as bill payment period, payday, or the like. In yet another embodiment, a transfer condition may be request-based, wherein a resource transfer may be triggered by a user request for execution of the transfer, wherein both a source and recipient user are required to agree on the transfer.

In specific embodiment, wherein the transferred resources are computing resources, a recipient or destination system or device may regularly require additional computing resources to perform resource-intensive computing tasks, wherein additional computing resources are leveraged or borrowed over the network to complete the task. In this embodiment, the transfer conditions may specify a number of computing resources to transfer and a period of time in which the resources will be leveraged by the receiving system. In another embodiment, the receiving system may leverage or borrow the additional computing resources from the source system until the resource-intensive task is complete. In yet another embodiment, the system may continuously monitor computing resource demand of the recipient system or device and fluctuate a number of computing resources transferred from the source system depending on the demand.

As illustrated in block 606, based on determining that the first transfer condition has been met, the system automatically transfers a number of resources from the second storage location to the first storage location. Execution of the resource transfer is triggered as a result of fulfilling the one or more transfer conditions as required by the smart contract. Without the predetermined transfer conditions being met, the resource transfer would not occur. In one embodiment, the system may transfer the resources to another storage location that is different than the first storage location. For example, upon determining that a first storage location does not have enough resources to pay a bill to an entity, the system may transfer a number of resources to pay the bill directly to the entity system from the second storage location.

As illustrated in block 608, the system determines that a second transfer condition has been met. In some embodiments, the system may establish one or more additional or second transfer conditions for determining additional transfers. In the embodiment of FIG. 6, a second transfer condition may determine a return of a previously transferred number of resources back to the second (i.e., source) storage location from the first (i.e., destination or recipient) storage location. In this embodiment, the transfer or resources is a temporary transfer, wherein the number of resources initially transferred is returned to the source storage location and the recipient storage location may benefit from the temporary resource increase to perform operations or interactions. In a specific example, the recipient storage location may be a financial account having a resource deficiency, wherein the borrowed resources may be used to temporarily alleviate the deficiency and the number of resources may be returned to the source storage location following a return transfer condition being fulfilled.

In one embodiment, a second transfer condition may be a second predetermined resource threshold of the first storage location (i.e., recipient), wherein the number of resources in the first storage location exceeds the second predetermined resource threshold which is higher than the first threshold previously discussed. In this case, the system may be configured to determine that the second transfer condition has been met by determining that the number of resources is available in the first storage location and not in use and exceeds the second predetermined resource threshold. The system may then automatically transfer the number of resources from the first storage location back to the second storage location to return the previously borrowed or leverage resources. In some embodiments, the system returns the resources without causing the first storage location to fall below the first predetermined resource threshold as discussed with respect to the previous blocks 604 and 606.

In another embodiment, the second transfer condition may comprise determining that a predetermined period of time has elapsed, wherein the transferred resource amount is transferred back to the source storage location following the period of time. In yet another embodiment, the second transfer condition may be a user-initiated transfer of the resources back to the source storage location from at least one of a user associated with the first or second storage locations. As previously discussed, in some embodiments, wherein the resource is a computing resource, the second transfer condition may comprise completion of a resource-intensive task, a lowered resource demand by the destination system or device, and/or a period of time having elapsed.

Accordingly, as illustrated in block 610, the system automatically transfers the number of resources form the first storage location back to the second storage location based on determining that the second transfer condition has been met. In some embodiments, this action may conclude the established smart contract depending on the requirements. In other embodiments, the smart contract may be a standing smart contract that continues to manage resource transfers between storage locations until a condition or event is met, such as user termination of the smart contract.

In some embodiments, the system may be configured to generate or output a message, notification, alert, or the like at any point during execution of the smart contract or resource transfer. For example, the system may generate a message following completion of the resource transfer or a return of a previously borrowed resource amount. In some embodiments, the message is output onto a hardware device associated with at least one of the first storage location and the second storage location (e.g., user device 110 and/or hardware output devices 115). In one embodiment, the system is configured to generate and output a message on the user device and/or the hardware output device. The hardware output device 115 may comprise a printer (e.g., an ATM printer, home printer), a facsimile (i.e., fax) device, a display of a user device (e.g., a screen or display), or the like. In some embodiments, the message may comprise a physical printed document (e.g., a receipt, a fax) or an electronic message physically displayed on a display device (e.g., an email, a text message). The system may be configured to control the hardware output device to produce or display the message to the user. For example, the message may include details of a resources transfer such as a receipt; remaining balance of a storage location; a date, time, or schedule for repayment of borrowed resources; an amount of resources transferred, or other resource transfer information.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with electronic resource transfers by incorporating smart contract technology in a block chain distributed network environment.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for implementing smart contract oversight for automatic electronic resource transfers, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
|---|---|---|
| 16/267,518 | SYSTEM FOR ASSESSING AND PRIORITIZING REAL TIME RESOUCE REQUIREMENTS | Concurrently herewith |
| 16/267,519 | SYSTEM FOR RESOURCE REQUIREMENTS AGGREGATION AND CATEGORIZATION | Concurrently herewith |
| 16/267,730 | SYSTEM FOR REAL TIME PROVISIONING OF RESOURCES BASED ON CONDITION MONITORING | Concurrently herewith |
| 16/267,521 | SYSTEM FOR REAL-TIME TRANSMISSION OF DATA ASSOCIATED WITH TRIGGER EVENTS | Concurrently herewith |
| 16/267,745 | NAVIGATION SYSTEM FOR MANAGING UTILIZATION OF RESOURCES | Concurrently herewith |

What is claimed is:

1. A system for smart contract dependent resource transfer, the system comprising:
at least one memory device with computer-readable program code stored thereon;
at least one communication device connected to a network; and
at least one processing device, wherein the at least one processing device is configured to execute the computer-readable program code to:
establish a smart contract between a first storage location associated with a first user and a second storage location associated with a second user, the smart contract being established on a block chain in a block chain distributed network environment, and the smart contract comprising:
a first transfer condition comprising the first storage location falling below a first predetermined resource threshold; and
a second transfer condition comprising the first storage location exceeding a second predetermined resource threshold after the first transfer condition has been met, wherein the second predetermined resource threshold is higher than the first predetermined resource threshold;
monitor the first storage location to determine, using the smart contract and based on the block chain, that the first transfer condition has been met;
based on determining that the first transfer condition has been met, automatically transfer, in a first transfer, a first number of resources from the second storage location to the first storage location;
create, using the block chain and based on the first transfer, a transaction in the block chain;
determine, using the smart contract, based on the block chain, and after the first transfer, that the second transfer condition has been met; and
automatically return, in a second transfer after the first transfer, the first number of resources from the first storage location to the second storage location based on determining that the second transfer condition has been met.

2. The system of claim 1, wherein the at least one processing device is further configured to execute the computer-readable program code to:
determine that the second transfer condition has been met by determining that the number of resources is available in the first storage location and not in use; and
automatically return, in the second transfer after the first transfer, the first number of resources from the first storage location to the second storage location without causing the first storage location to fall below the first predetermined resource threshold.

3. The system of claim 1, wherein the second transfer condition comprises a predetermined period of time having elapsed.

4. The system of claim 1, wherein the at least one processing device is further configured to execute the computer-readable program code to generate a message following completion of a resource transfer, wherein the message is output on a hardware device associated with at least one of the first storage location and the second storage location.

5. The system of claim 1, wherein the resources comprise computing resources.

6. The system of claim 1, wherein the first transfer condition comprises a predetermined period of time having elapsed.

7. A computer program product for smart contract dependent resource transfer, wherein the computer program product comprises at least one non-transitory computer-readable medium comprising computer-readable instructions, the computer-readable instructions, when executed by at least one processing device, cause the at least one processing device to:
establish a smart contract between a first storage location associated with a first user and a second storage location associated with a second user, the smart contract being established on a block chain in a block chain distributed network environment, and the smart contract comprising:
a first transfer condition comprising the first storage location falling below a first predetermined resource threshold; and
a second transfer condition comprising the first storage location exceeding a second predetermined resource threshold after the first transfer condition has been met, wherein the second predetermined resource threshold is higher than the first predetermined resource threshold;
monitor the first storage location to determine, using the smart contract and based on the block chain, that the first transfer condition has been met;
based on determining that the first transfer condition has been met, automatically transfer, in a first transfer, a first number of resources from the second storage location to the first storage location;

create, using the block chain and based on the first transfer, a transaction in the block chain;

determine, using the smart contract, based on the block chain, and after the first transfer, that the second transfer condition has been met; and automatically return, in a second transfer after the first transfer, the first number of resources from the first storage location to the second storage location based on determining that the second transfer condition has been met.

8. The computer program product of claim 7, wherein the computer-readable instructions, when executed by the at least one processing device, cause the at least one processing device to:

determine that the second transfer condition has been met by determining that the number of resources is available in the first storage location and not in use; and automatically return, in the second transfer after the first transfer, the first number of resources from the first storage location to the second storage location without causing the first storage location to fall below the first predetermined resource threshold.

9. The computer program product of claim 7, wherein the second transfer condition comprises a predetermined period of time having elapsed.

10. The computer program product of claim 7, wherein the computer-readable instructions, when executed by the at least one processing device, cause the at least one processing device to generate a message following completion of a resource transfer, wherein the message is output on a hardware device associated with at least one of the first storage location and the second storage location.

11. The computer program product of claim 7, wherein the resources comprise computing resources.

12. The computer program product of claim 7, wherein the first transfer condition comprises a predetermined period of time having elapsed.

13. A computer-implemented method for smart contract dependent resource transfer, the computer-implemented method comprising:

establishing a smart contract between a first storage location associated with a first user and a second storage location associated with a second user, the smart contract being established on a block chain in a block chain distributed network environment, and the smart contract comprising:

a first transfer condition comprising the first storage location falling below a first predetermined resource threshold; and a second transfer condition comprising the first storage location exceeding a second predetermined resource threshold after the first transfer condition has been met, wherein the second predetermined resource threshold is higher than the first predetermined resource threshold;

monitoring the first storage location to determine, using the smart contract and based on the block chain, that the first transfer condition has been met;

based on determining that the first transfer condition has been met, automatically transferring, in a first transfer, a first number of resources from the second storage location to the first storage location;

creating, using the block chain and based on the first transfer, a transaction in the block chain;

determining, using the smart contract, based on the block chain, and after the first transfer, that the second transfer condition has been met; and automatically returning, in a second transfer after the first transfer, the first number of resources from the first storage location to the second storage location based on determining that the second transfer condition has been met.

14. The computer-implemented method of claim 13, comprising:

determining that the second transfer condition has been met by determining that the number of resources is available in the first storage location and not in use; and automatically returning, in the second transfer after the first transfer, the first number of resources from the first storage location to the second storage location without causing the first storage location to fall below the first predetermined resource threshold.

15. The computer-implemented method of claim 13, wherein the second transfer condition comprises a predetermined period of time having elapsed.

16. The computer-implemented method of claim 13, comprising generating a message following completion of a resource transfer, wherein the message is output on a hardware device associated with at least one of the first storage location and the second storage location.

17. The computer-implemented method of claim 13, wherein the resources comprise computing resources.

18. The computer-implemented method of claim 13, wherein the first transfer condition comprises a predetermined period of time having elapsed.

* * * * *